(12) United States Patent
Brack et al.

(10) Patent No.: US 11,125,181 B2
(45) Date of Patent: Sep. 21, 2021

(54) INTERNAL COMBUSTION ENGINE (71) Applicant: Bayerische Motoren Werke Aktiengesellschaft, Munich (DE)

(72) Inventors: Wolfgang Brack, Munich (DE); Alexander Hiereth, Munich (DE); Timo Klees, Hebertshausen (DE); Lukas Schaefer, Munich (DE); Florian Schwarzmueller, Unterschleissheim (DE); Dominik Suckart, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/784,710

(22) Filed: Feb. 7, 2020

(65) Prior Publication Data

US 2020/0173392 A1 Jun. 4, 2020

Related U.S. Application Data

(63) Continuation of application No. PCT/EP2018/071538, filed on Aug. 8, 2018.

(30) Foreign Application Priority Data

Sep. 26, 2017 (DE) ..................... 10 2017 216 996.6

(51) Int. Cl.
*F02F 1/24* (2006.01)
*F02F 3/28* (2006.01)

(52) U.S. Cl.
CPC ................. *F02F 1/24* (2013.01); *F02F 3/28* (2013.01); *F02F 2001/241* (2013.01)

(58) Field of Classification Search
CPC ............................ F02B 23/063; F02B 23/0642; F02B 23/0675; F02F 1/24; F02F 2001/241; F02F 3/26; F02F 3/28
See application file for complete search history.

(56) References Cited

U.S. PATENT DOCUMENTS

| | | | |
|---|---|---|---|
| 4,041,909 A | 8/1977 | Nakamura | |
| 4,117,813 A * | 10/1978 | Yamashita | ................ F01N 3/26 |
| | | | 123/179.16 |

(Continued)

FOREIGN PATENT DOCUMENTS

| | | |
|---|---|---|
| CN | 1611752 A | 5/2005 |
| CN | 1221729 C | 10/2005 |

(Continued)

OTHER PUBLICATIONS

JP 2009-041397, Feb. 2009, Inoue et al. (machine translation).*

(Continued)

*Primary Examiner* — Phutthiwat Wongwian
*Assistant Examiner* — Diem T Tran
(74) *Attorney, Agent, or Firm* — Crowell & Moring LLP (57) ABSTRACT

An internal combustion engine for a motor vehicle has at least one cylinder, a cylinder head, and a piston which is movably mounted in the cylinder and has a combustion chamber side which delimits a combustion chamber with the cylinder head and the cylinder. The cylinder head has a combustion chamber roof, in which at least two valve seats for at least one inlet valve and at least one outlet valve are provided. The combustion chamber roof has at least one arched cylinder head section which is arranged between the at least two valve seats and points away from the combustion chamber.

9 Claims, 5 Drawing Sheets

(56) References Cited

U.S. PATENT DOCUMENTS

| | | | |
|---|---|---|---|
| 4,162,661 A | 7/1979 | Nakanishi et al. | |
| 5,138,989 A | 8/1992 | Fraidl et al. | |
| 5,335,635 A | 8/1994 | Kadoi et al. | |
| 6,502,540 B1 | 1/2003 | Smith | |
| 2002/0189583 A1* | 12/2002 | Inoue | F02F 1/4214 123/301 |
| 2003/0159675 A1* | 8/2003 | Huebier | F02F 3/26 123/306 |
| 2005/0109328 A1 | 5/2005 | Sakai et al. | |
| 2005/0172926 A1* | 8/2005 | Poola | F02B 23/0672 123/193.6 |

FOREIGN PATENT DOCUMENTS

| | | |
|---|---|---|
| CN | 1871414 A | 11/2006 |
| CN | 1329644 C | 8/2007 |
| CN | 101220782 A | 7/2008 |
| CN | 201546800 U | 8/2010 |
| CN | 101929411 A | 12/2010 |
| CN | 201891519 U | 7/2011 |
| CN | 103362634 A | 10/2013 |
| CN | 203271936 U | 11/2013 |
| CN | 204851420 U | 12/2015 |
| DE | 43 24 642 A1 | 1/1994 |
| DE | 10 2005 035 296 B4 | 10/2007 |
| DE | 10 2014 009 993 A1 | 12/2014 |
| EP | 0 444 018 A1 | 8/1991 |
| EP | 1 338 782 A1 | 8/2003 |
| EP | 1 561 924 A2 | 8/2005 |
| JP | 64-15423 A | 1/1989 |
| JP | 1-219310 A | 9/1989 |
| JP | 2001-3754 A | 1/2001 |
| JP | 2001-59422 A | 3/2001 |
| JP | 2007-2800 A | 1/2007 |
| JP | 2009-041397 * | 2/2009 |
| JP | 2016-125447 A | 7/2016 |
| WO | WO 2005/075815 A1 | 6/2005 |
| WO | WO 2016/070291 A1 | 5/2016 |

OTHER PUBLICATIONS

International Search Report (PCT/ISA/210) issued in PCT Application No. PCT/EP2018/071538 dated Nov. 9, 2018 with English translation (five (5) pages).

German-language Written Opinion (PCT/ISA/237) issued in PCT Application No. PCT/EP2018/071538 dated Nov. 9, 2018 (five (5) pages).

German-language Office Action issued in counterpart German Application No. 10 2017 216 996.6 dated May 8, 2018 (12 pages).

Chinese Office Action issued in Chinese application No. 201880042513.5 dated Feb. 23, 2021, with English translation (Seventeen (17) pages).

* cited by examiner

INTERNAL COMBUSTION ENGINE

CROSS REFERENCE TO RELATED APPLICATIONS

This application is a continuation of PCT International Application No. PCT/EP2018/071538, filed Aug. 8, 2018, which claims priority under 35 U.S.C. § 119 from German Patent Application No. 10 2017 216 996.6, filed Sep. 26, 2017, the entire disclosures of which are herein expressly incorporated by reference.

BACKGROUND AND SUMMARY OF THE INVENTION

The present invention relates to an internal combustion engine for a motor vehicle.

An internal combustion engine usually has at least one cylinder, a cylinder head and a piston which is mounted movably in the cylinder. These elements together delimit a combustion chamber of the internal combustion engine, in which combustion chamber a mixture is burned which consists at least of air and fuel.

During a combustion process, the piston moves between a top maximum point and a bottom maximum point which are also called the top dead center and the bottom dead center. In the case of an upward movement of the piston, in particular a movement of the piston in the direction of the cylinder head, the mixture can be compressed in the combustion chamber. When the piston has reached the top dead center, a spark plug which is arranged in the cylinder head ignites the mixture by way of the production of an initial flame.

In order to achieve a combustion of the mixture which is as rapid and efficient as possible, it is advantageous if the mixture has turbulent kinetic energy (TKE) which is as high as possible. The turbulent kinetic energy results from the flow behavior of the mixture, and is influenced decisively by way of the geometry of the combustion chamber.

It is therefore an object of the present invention to provide an internal combustion engine for a motor vehicle with an optimized combustion chamber.

According to the invention, this and other objects are achieved by way of an internal combustion engine for a motor vehicle, having at least one cylinder, a cylinder head and a piston which is mounted movably in the cylinder and has a combustion chamber side which delimits a combustion chamber with the cylinder head and the cylinder. The cylinder head has a combustion chamber roof, in which at least two valve seats for at least one inlet valve and at least one outlet valve are provided. The combustion chamber roof has a domed cylinder head section which is arranged between the at least two valve seats and is directed away from the combustion chamber.

As a result of the domed cylinder head section which is directed away from the combustion chamber, the combustion chamber roof can have an approximately hemispherical geometry. As a result, a particularly advantageous combustion chamber geometry on the part of the cylinder head can be achieved. On the basis of this, the flow behavior of the mixture during the intake process can be influenced advantageously.

In accordance with one embodiment, an active region of the combustion chamber roof is of substantially edge-free configuration. The active region of the combustion chamber roof is the region which substantially constitutes the hemispherical geometry of the combustion chamber roof. In particular, the tumble flow of the mixture is not disrupted as a result of the edge-free configuration of the combustion chamber roof. During the compression, the turbulent kinetic energy of the fuel/air mixture can therefore be generated and can be maintained in an optimum manner.

A high combustion speed can be achieved by way of the high turbulent kinetic energy, with the result that an initial flame can propagate particularly rapidly in the mixture. In addition, the high combustion speed leads to a mixture which is situated in the combustion chamber during a combustion cycle being burned as completely as possible, with virtually no unburned fuel remaining in the combustion chamber.

Overall, a particularly satisfactory degree of thermodynamic efficiency and a reduced consumption are achieved by way of the internal combustion engine according to the invention.

The combustion chamber roof has preferably been produced completely by machining. As a result, the reproducibility of the combustion chamber roof is improved, since machining is subject to lower manufacturing tolerances than a casting process. As a result, the active region which is substantially edge-free and in turn results in the hemispherical geometry can be produced with minimal variations.

The piston preferably has a depression which is, in particular, lenticular and is rotationally symmetrical with respect to a piston axis, a diameter of the depression being smaller than an overall diameter of the piston. The depression allows a flow to develop in an optimum manner, in order to generate a tumble movement in the combustion chamber (as early as during the inflow). To this extent, the depression assists the maintenance of the turbulent kinetic energy at the time of the combustion. In addition, just like the combustion chamber roof, the depression has an influence on the combustion chamber and therefore on the compression ratio of the internal combustion engine.

At its center point, the depression of the piston preferably has a depth of between 0.2 mm and 10 mm, in particular of between 0.5 mm and 8 mm. Said depth has proved to be particularly advantageous with regard to the charge movement and the flame propagation. The depth of the depression is usually fixed in combination with the combustion chamber roof in accordance with a predefined compression ratio of the internal combustion engine. The compression ratio corresponds to the ratio of the overall combustion chamber before the compression when the piston is situated at the bottom dead center to the remaining space after the compression when the piston is situated at the top dead center.

A projected area of the depression preferably has an area proportion of from 70% to 80% of the piston on the end side (that is to say, the combustion chamber side) of the piston. This geometry ensures a correspondingly high area proportion of the depression and its influence on the overall combustion chamber correspondingly.

The depression can enclose an approximately spherical volume together with the combustion chamber roof, in particular with the active region of the combustion chamber roof, which approximately spherical volume serves as a combustion chamber. This aids the flame propagation in the combustion chamber, which leads to particularly efficient combustion.

In accordance with one embodiment, the cylinder head has squish faces in the form of circular face sections merely on two edge sections which lie opposite one another, which squish faces are delimited in each case by way of one of two transitions in the cylinder head which run parallel to one another, the two squish faces having a different area size.

The spark plug is preferably arranged eccentrically in the cylinder head. This is due to the construction of the combustion chamber, in particular due to the arrangement of valves in the cylinder head, and due to the arrangement of an injector. When air or a mixture which comprises at least air and fuel flows via an inlet valve into the combustion chamber, it is usually accelerated in the direction of the outlet side of the combustion chamber.

A low flow speed in the region of the spark plug is advantageous, since an initial flame can propagate particularly satisfactorily in the case of a low flow speed. If the flow speed is too high, the ignition spark can be blown away and the corresponding flame can be extinguished, as a result of which the mixture would be ignited insufficiently or even not at all, which has a negative influence on the efficiency of the combustion process.

On its combustion chamber side, the piston preferably has piston squish faces which correspond to the cylinder head. In particular, the piston has two piston squish faces which lie radially opposite one another in relation to a longitudinal axis of the piston. In one alternative embodiment, the piston squish faces can be smaller than the squish faces of the cylinder head. This corresponds to an increased diameter of the depression.

The piston squish faces are preferably configured in the shape of a partial circle, in particular are of circular section-shaped or arcuate configuration.

With regard to the area size, the piston squish face which is assigned to the outlet side of the cylinder head corresponds approximately to the corresponding squish face of the cylinder head. In terms of area, the piston squish face which is assigned to the inlet side of the cylinder head can be of smaller configuration than the corresponding squish face of the cylinder head.

A masking is preferably arranged parallel to the valve axis of the inlet valve in the combustion chamber roof next to a valve seat, which masking has a height of between 2 mm and 3.5 mm. The masking achieves a situation where an overflow of the inlet valves results, in particular, in the case of small valve lifts, which has the consequence of a tumble movement of the mixture. The turbulence level is increased by way of the tumble movement.

On its combustion chamber side, the piston preferably has at least two cutouts which are configured as valve seat pockets. The valve seat pockets serve as a mechanical securing means, in order to avoid a collision between the valve and the piston.

In accordance with one preferred embodiment, two domed cylinder head sections are provided in the cylinder head, in particular in the combustion chamber roof, which domed cylinder head sections are arranged in each case between two valve seats which are assigned to an inlet valve and an outlet valve. This results in a design of the combustion chamber which is, in particular, spherical and is particularly favorable with regard to the combustion process. The two domed cylinder head sections therefore both lie between the inlet side and the outlet side of the cylinder head, with the result that they both provide an approximately identical proportion of the improvement of the flow behavior.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
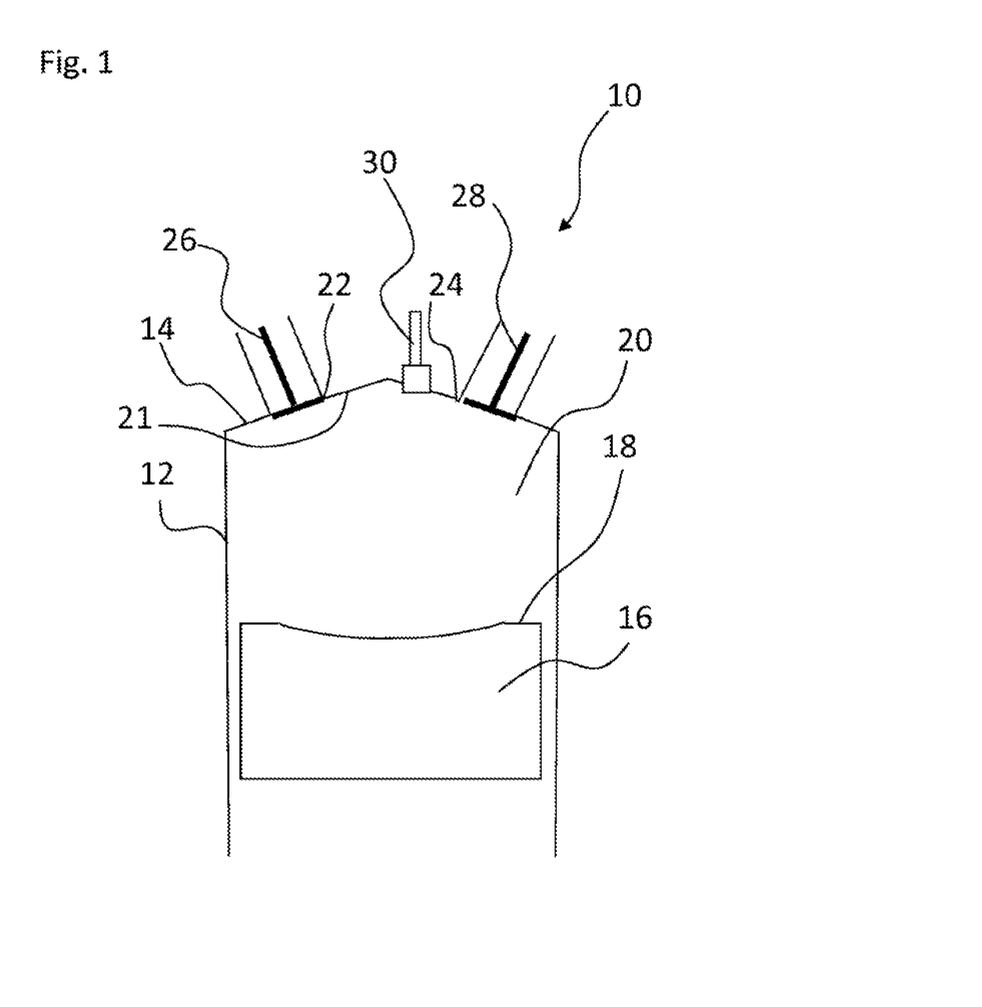
FIG. 1 diagrammatically shows an internal combustion engine according to an embodiment of the invention.

FIG. 1 diagrammatically shows an internal combustion engine 10 having a cylinder 12, a cylinder head 14 and a piston 16 which is mounted movably in the cylinder 12.

The piston 16 has a combustion chamber side 18 which delimits a combustion chamber 20 of the internal combustion engine 10 together with the cylinder head 14 and the cylinder 12, the cylinder head 14 having a combustion chamber roof 21 which is directed toward the combustion chamber 20. Valve seats 22, 24 for at least one inlet valve 26 and outlet valve 28 and a spark plug 30 are arranged in the cylinder head 14, in particular in the combustion chamber roof 21. The spark plug 30 is arranged eccentrically, in particular.

The elements which are shown diagrammatically in FIG. 1 are described in detail in the following figures.

The general method of operation of internal combustion engines is sufficiently known from the prior art; therefore, this is not described in further detail at this point, since the geometry of the cylinder head 14 is important in the following, in particular the geometry of that side of the cylinder head 14 which is directed toward the combustion chamber 20.

Figure 2:
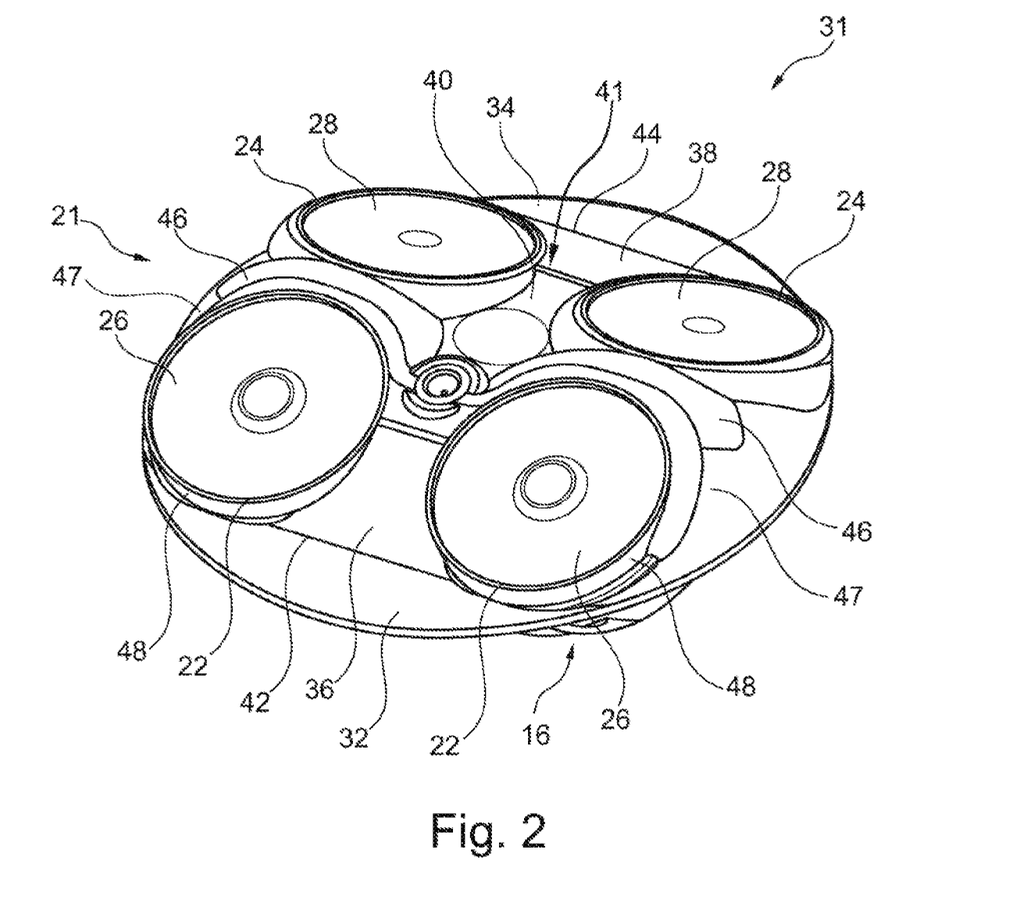
FIG. 2 shows a combustion chamber volume of an internal combustion engine according to an embodiment of the invention.

FIG. 2 shows a combustion chamber volume 31 of an internal combustion engine 10 in a state in which the piston 16 is situated at the top maximum point. The combustion chamber volume 31 is delimited by way of the cylinder head 14, in particular its combustion chamber roof 21, together with the cylinder 12 and the piston 16.

Therefore, FIG. 2 shows essentially a negative image of the cylinder head 14, in particular its combustion chamber roof 21, and the piston 16.

In a plan view, the cylinder head 14, in particular the combustion chamber roof 21, has a round external geometry and has substantially five faces 32, 34, 36, 38, 40 which are angled away with respect to one another. The faces 38, 40 and 36, 40 are in each case rounded with respect to one another, in order to avoid sharp edges in an active region 41 of the combustion chamber roof 21 at the corresponding transitions of the faces 36-40. The active region 41 of the combustion chamber roof 21 preferably comprises, inter alia, the faces 36, 38, 40.

The faces 32, 34 which are arranged laterally on the cylinder head 14 are in each case a squish face. The shape of the squish faces 32, 34 corresponds to the shape of a circular section, the squish faces 32, 34 being delimited (radially) to the inside in each case by way of one of two transitions 42, 44 which run parallel to one another, whereas the outer edge of a cylinder liner delimits the squish faces 32, 34 (radially) to the outside. Accordingly, the two squish faces 32, 34 are arranged in opposite edge sections of the cylinder head 14.

The transitions 42, 44 are provided in each case between the squish faces 32, 34 and the adjoining faces 36, 38 which, starting from the squish faces 32, 34, extend to the center point of the cylinder head 14 and are part of the active region 41. The transitions 42, 44 are at a different spacing from the center point of the cylinder head 14.

In the embodiment which is shown, the squish face 32 which is assigned to the inlet side (that is to say, the inlet valves 26) is greater in terms of area than the squish face 34 which is assigned to the outlet side, that is to say the squish face 34 which is assigned to the outlet valves 28.

Domed sections 46, 47 are arranged in each case in the cylinder head 14 between the valve seats 22, 24, in particular between in each case a valve seat 22 for an inlet valve 26 and a valve seat 24 for an outlet valve 28. The domed sections 46, 47 are likewise part of the active region 41 of the combustion chamber roof 21, said sections 46, 47 being domed in such a way that their curvature points away from the combustion chamber 20.

As a result of the domed sections 46, 47, in particular their curvature, the combustion chamber roof 21 can have a substantially hemispherical geometry. By way of this, a flame propagation in the combustion chamber 20 is aided, which in turn leads to a thermodynamically optimum combustion, as will still be described in the following text.

The cylinder head 14, in particular the combustion chamber roof 21, has a total of four valve seats 22, 24 for two inlet valves 26 and two outlet valves 28. A masking 48 is arranged in each case parallel to the valve axis in the combustion chamber roof 21 in a manner which adjoins the valve seat 22 of the inlet valves 26, which masking 48 has a height of between 2 mm and 3.5 mm. The masking 48 ensures a high tumble movement of the mixture which flows in via the inlet valves 26, which leads to an increase in the turbulent kinetic energy of the mixture and therefore to an increased burning speed and an optimized flame propagation.

Figure 3:
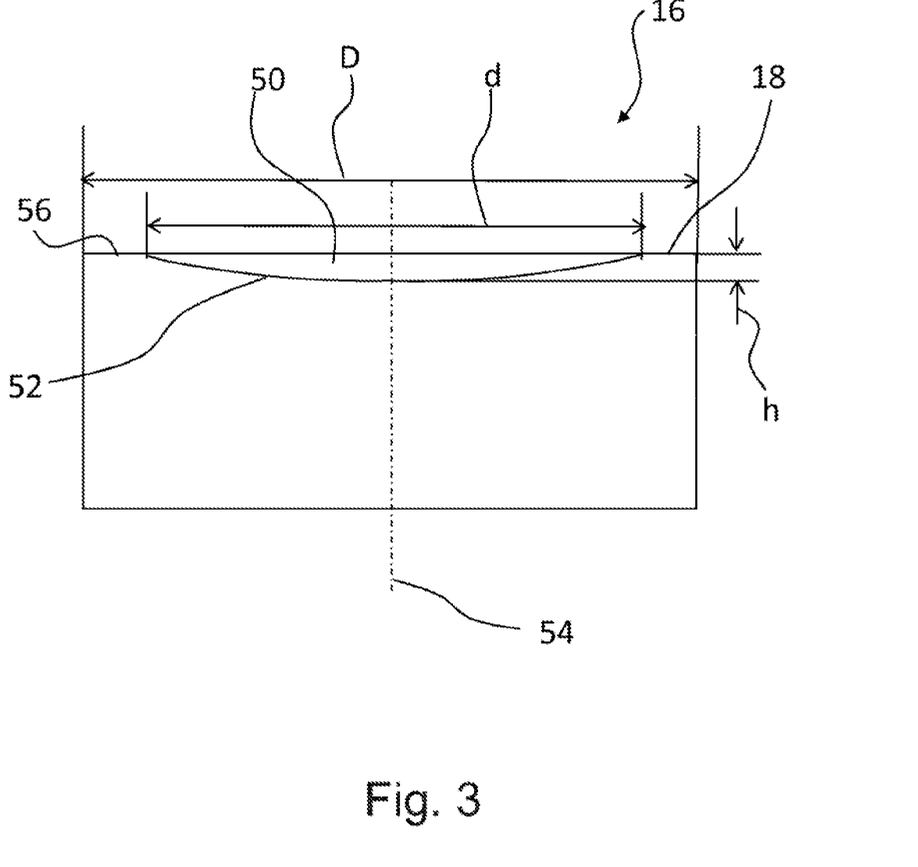
FIG. 3 shows a piston of an internal combustion engine according to an embodiment of the invention in a sectional view.

FIG. 3 shows a piston 16 in a sectional view, which piston 16 has been produced, for example, in a high pressure die casting process.

A depression 50 which is rotationally symmetrical and lenticular is made on the combustion chamber side 18 of the piston 16, which combustion chamber side 18 delimits the combustion chamber 20 of the internal combustion engine 10 together with the cylinder 12 and the cylinder head 14, in particular the combustion chamber roof 21. The depression 50 has a bottom face 52 and a height h of between 0.5 mm and 8 mm. The depression 50 of the piston 16 is of rotationally symmetrical configuration with regard to a longitudinal axis 54.

The curvature of the depression 50 corresponds, for example, substantially to the curvature of the domed sections 46, 47 of the cylinder head 14, said curvature being oriented in an opposed manner. As a result, the combustion chamber 20 can be configured to be as symmetrical as possible. As a result of the interplay of the active region 41, in particular of the curved sections 46, 47 and the lenticular depression 50, the combustion chamber 20 is approximately spherical, which is optimum with regard to the combustion.

The tumble which is generated during the inflow of the mixture is assisted and maintained on account of said geometry of the combustion chamber 20.

The diameter d of the depression 50 is smaller than the overall diameter D of the piston 16, as a result of which a circumferential web 56 is formed which surrounds the depression 50 radially. A part of the circumferential web 56 forms piston squish faces 58, 60 of the piston 16 which will be described in greater detail in conjunction with FIG. 4. The overall diameter D of the piston 16 corresponds approximately to the internal diameter of the cylinder 12.

In general, the compression ratio of the internal combustion engine 10 can be set (additionally) via the depth of the depression 50, as long as the mechanical boundary conditions and/or limits are taken into consideration, for example with regard to the stability of the piston 16.

Figure 4:
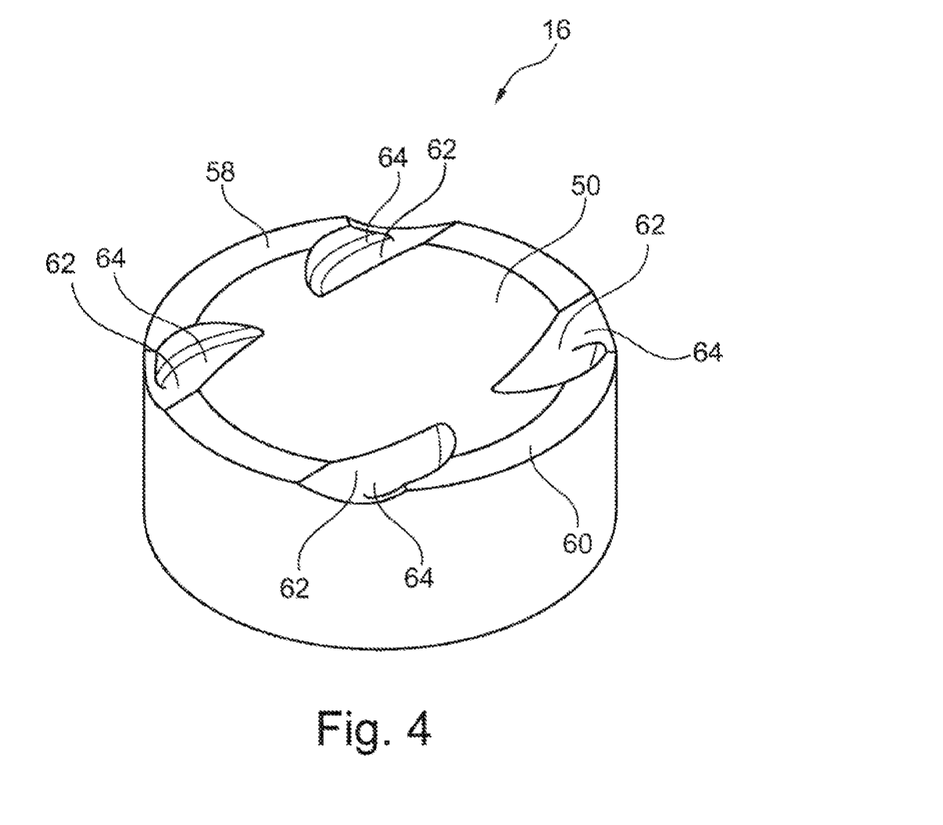
FIG. 4 shows the piston from FIG. 3 in a perspective view.

FIG. 4 shows the piston 16 in a perspective view. It is apparent from this view that, in addition to the depression 50 which can already be seen in FIG. 3, the piston 16 has cutouts 62 which are configured as valve seat pockets. The cutouts 62 serve as a mechanical securing elements 64, in order to avoid a collision of the valves 26, 28 with the piston 16.

Figure 5:
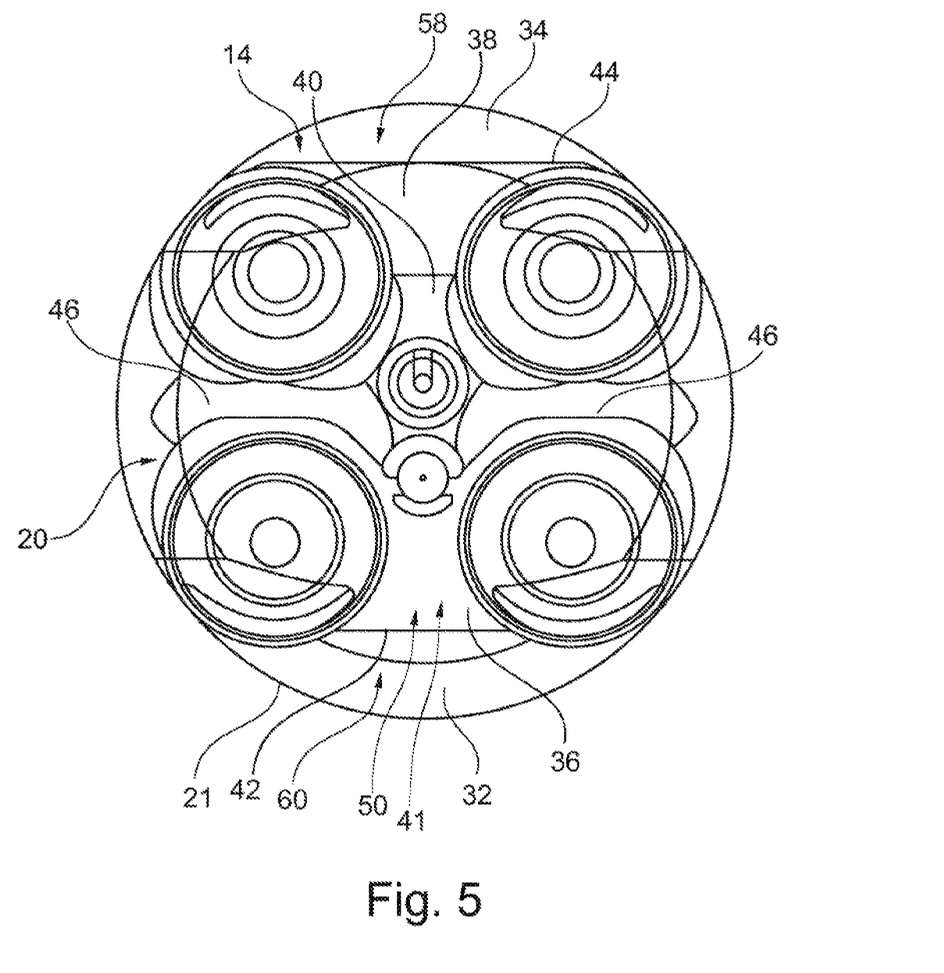
FIG. 5 shows the combustion chamber of an internal combustion engine in a plan view, the piston which is assigned to the combustion chamber being shown in a transparent manner.

FIG. 5 shows the combustion chamber 20, in particular the combustion chamber volume 21 in a plan view, the piston 16 being shown in a transparent manner.

The piston squish faces 58, 60 are oriented on that squish face 34 of the cylinder head 14 which is assigned to the outlet side; in particular, the piston squish faces 58, 60 overlap the squish faces 32, 34 of the cylinder head 14 at least partially. In one alternative embodiment, the piston squish faces 58, 60 can be smaller in area terms than the squish faces 32, 24 of the cylinder head 14.

As has already been described, both the generated tumble and the turbulent kinetic energy of the mixture which is sucked in are maintained for as long as possible on account of the geometry of the combustion chamber 20, as a result of which a high burning speed can be achieved, with the result that an initial flame which emanates from the spark plug 30 can propagate rapidly in the mixture. As a result, the efficiency of the internal combustion engine 10 rises correspondingly.

The geometry necessary for this purpose of the combustion chamber 20 is achieved, inter alia, by way of the active region 41 of the combustion chamber roof 21, which active region 41 is of substantially edge-free configuration and interacts with the depression 50 in the piston 16.

In order to configure the combustion chamber roof 21 in this way, it is (exclusively) machined.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal combustion engine for a motor vehicle, comprising:
    at least one cylinder;
    a cylinder head;
    a piston which is mounted movably in the cylinder and has a combustion chamber side which delimits a combustion chamber with the cylinder head and the cylinder, wherein
    the cylinder head has a combustion chamber roof, in which at least two valve seats for at least one inlet valve and at least one outlet valve are provided,
    the combustion chamber roof has at least one domed cylinder head section which is arranged between the at least two valve seats and points away from the combustion chamber,
    the cylinder head has squish faces in a form of circular face sections merely on two edge sections which lie opposite one another,
    said squish faces are delimited in each case by way of one of two straight line transitions in the cylinder head which run parallel to one another, the two squish faces having a different area size, the squish faces are assigned to an inlet side and an outlet side of the cylinder head, the squish face which is assigned to the inlet side has a greater area than the squish face which is assigned to the outlet side, and an active region of the combustion chamber roof is comprised of a first face, a second face, and a third face, wherein the first face and the third face are rounded with respect to one another at a transition between the first face and the third face and wherein the second face and the third face are rounded with respect to one another at a transition between the second face and the third face such that the combustion chamber roof has an edge-free configuration without sharp edges in the active region.

2. The internal combustion engine according to claim 1, wherein the combustion chamber roof is an exclusively machined combustion chamber roof.

3. The internal combustion engine according to claim 1, wherein the piston has a depression which is lenticular and is rotationally symmetrical with respect to a piston axis, a diameter of the depression being less than an overall diameter of the piston.

4. The internal combustion engine according to claim 3, wherein at a center point, the depression has a depth of between 0.2 mm and 10 mm.

5. The internal combustion engine according to claim 3, wherein at a center point, the depression has a depth of between 0.5 mm and 8 mm.

6. The internal combustion engine according to claim 3, wherein the depression encloses a spherical volume together with the combustion chamber roof.

7. The internal combustion engine according to claim 3, wherein the depression encloses a spherical volume together with the active region of the combustion chamber roof.

8. The internal combustion engine according to claim 1, further comprising:

a masking arranged parallel to the valve axis of the inlet valve in the combustion chamber roof next to a valve seat, which masking has a height of between 2 mm and 3.5 mm.

9. The internal combustion engine according to claim 1, wherein two domed cylinder head sections are provided which are arranged in each case between two valve seats which are assigned to an inlet valve and an outlet valve.

* * * * *